United States Patent

[11] 3,581,653

[72] Inventors Kenneth J. Boyer
Camberley, England;
John Patrick Raymond Bell, Hayling Island, England; Grace Bell, Administratrix, of said John Patrick Raymond Bell, deceased, Putney, England
[21] Appl. No. 786,192
[22] Filed Dec. 23, 1968
[45] Patented June 1, 1971
[73] Assignee Carillon Engineering Limited
Chamberley, Surrey, England

[54] COOKERS FOR COOKING EGGS
12 Claims, 4 Drawing Figs.
[52] U.S. Cl....................................... 99/332,
99/440, 294/116
[51] Int. Cl............................................ A47j 29/02
[50] Field of Search............................. 99/324–
–328, 332, 333, 336, 440, 441; 219/411, 415—419; 294/116

[56] References Cited
UNITED STATES PATENTS
| | | | |
|---|---|---|---|
| 437,706 | 10/1890 | Mathias......................... | 99/440 |
| 999,257 | 8/1911 | Radtke......................... | 99/440 |
| 2,459,933 | 1/1949 | Gomersall..................... | 99/440X |
| 3,065,688 | 11/1964 | Lindemann.................... | 99/440X |

FOREIGN PATENTS
| | | | |
|---|---|---|---|
| 1,003,890 | 9/1965 | Great Britain............... | 99/440 |
| 420,395 | 4/1947 | Italy............................. | 99/440 |

Primary Examiner—Daniel Blum
Attorney—Holcombe, Wetherill and Brisebois

ABSTRACT: An electrical cooker for cooking poultry eggs in their shells without water comprises an open-topped cooking chamber with a radiant electrical heating element and a holder for an egg which is arranged to be inserted into the chamber through the open top. The holder comprises a part which forms a closure for the chamber and three or more depending fingers which are spring-loaded towards each other and arranged to hold an egg between them. Above the closure part is a manually operable button depression of which opens the fingers apart from each other to allow an egg to be inserted between them or to allow a cooked egg to be deposited by the holder into an egg cup. Preferably the cooking chamber is of upwardly tapering truncated conical shape and the heating element is ring-shaped and is in the lower part of the chamber where it surrounds the lower part of the egg while it is being cooked.

Patented June 1, 1971

Patented June 1, 1971

COOKERS FOR COOKING EGGS

This invention relates to electrical cookers for cooking poultry eggs in their shells without water, and according to the invention, such a cooker comprises an open-topped cooking chamber with a radiant electrical heating element and a holder for an egg which is arranged to be inserted into the chamber through the open top, the holder comprising a part which forms a closure for the chamber and three or more fingers depending from the closure part, the fingers being spring-loaded towards each other and arranged to hold an egg between them.

Such cookers can be used at the table in much the same way as electric toasters, and the mess inherent in boiling eggs in a saucepan is avoided since cracking of the eggs, which is not infrequent when they are boiled, is extremely rare.

The heat produced in the cooking chamber is mainly radiant heat although the air in the chamber is heated and causes some convection heat as well. It is therefore essential that the holder should expose substantially the whole surface of the eggshell to the heat in the cooking chamber if the egg is to be cooked satisfactorily. This is achieved by the holder having fingers for holding the egg. The fact that the fingers are spring-loaded towards each other enables eggs of different sizes to be gripped by the holder and cooked satisfactorily.

Preferably the holder also has a mechanism which is manually operable by an operating member on top of the closure part which opens the fingers apart against their spring loading to allow an egg to be inserted between them before cooking and to allow a cooked egg to be deposited by the holder into an egg cup. Thus, with this arrangement, the hot cooked egg can be transferred from the holder to an egg cup without it being necessary to touch it manually at all.

To aid the even cooking of the egg, the cooking chamber is preferably of upwardly tapering truncated conical shape and of a size to receive a single egg in an upright position, and the heating element is ring-shaped and is in the lower part of the chamber where, in use, it surrounds the lower part of an egg in the chamber.

It is an advantage of this arrangement that the space in the center of the bottom of the cooking chamber is unobstructed by the heating element, and therefore any droppings which may occur, either as waster matter which had adhered to an egg shell or in the unlikely event of an egg cracking, fall clear of the heating element. The bottom of the chamber may be made removable so that it can be withdrawn to clean any droppings from it.

The conical wall of the cooking chamber is preferably made of a metal which is a good reflector of heat, for example aluminum or of a thermally insulating material which assists in holding the convected hot air in the top of the chamber.

Preferably the cooker has a switch in the circuit of the heating element and a timing device which opens the switch after an adjustable preset time interval.

The switch may also be operated by a mechanism actuated by insertion and removal of the holder from the cooking chamber, the arrangement being that the switch cannot be closed except when the chamber is closed by the closure part of the holder.

The cooker may have two or more separate cooking chambers each having its own heating element and egg holder, but there may be a common circuit for the heating elements, in which case only one switch is necessary and this can be controlled by a single timing device. If the switch is also controlled by a mechanism which is actuated by the insertion and removal of the holders from the cooking chambers, the switch cannot be closed except when all the holders are in their own chambers.

An example of a cooker in accordance with the invention will now be described with reference to the accompanying drawings, in which.

Figure 1:
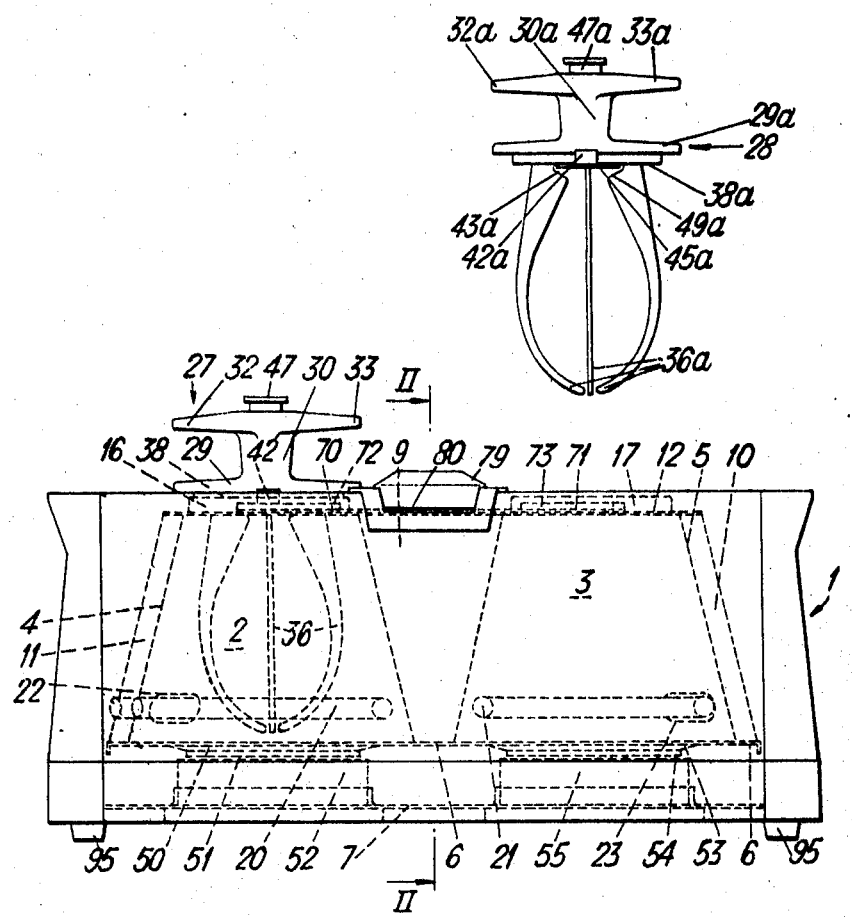
FIG. 1 is a side elevation of a cooker with two cooking chambers, showing one holder inserted in its chamber and the other holder removed.

The cooker has an outer casing 1 and contains two cooking chambers 2 and 3. These chambers are formed by two similar truncated aluminum cones 4 and 5 which are open at the top and bottom and which are positioned with their wide bottoms on a lower support plate 6. This plate 6 is fixed to and extends between the end walls of the casing 1 so that it lies parallel to the base 7 of the casing 1. The truncated cones 4 and 5 are fixed on the plate 6 by means of tabs which are punched from the plate 6 and clip over the bottom rims of the truncated cones.

The two truncated cones 4 and 5 are formed as one unit formed by two halves which are joined along the plane through the axes of the two truncated cones. Each half consists of two truncated cone halves which have their adjacent edges joined by a web 9 and which have flanges 10 and 11 extending outwards from their outer edges. In assembly, the two halves are placed face to face and the two inner webs 9 and the cooperating outer flanges 10 and 11 are spot welded together.

Resting on the top of the truncated cones 4 and 5 is an upper support plate 12 having two holes 13 and 14 through it which are slightly smaller than, and concentric with the open tops of the truncated cones 4 and 5 respectively. The plate 12 is held in position by means of tabs 15 punched downwards from the edge of the plate 12 and lying flush with the walls of the truncated cones. The edges of the holes 13 and 14 are turned upwards to form circular flanges 16 and 17, and these flanges form circular rims 18 and 19 for the openings to the cooking chambers 2 and 3 within the truncated cones 4 and 5 respectively.

The cooking chambers 2 and 3 are heated by electrical ring heating elements 20 and 21 respectively which are mounted coaxially within and near the bottom of the chambers. The ends of the elements 20 and 21 extend out from the chambers through slots 22 and 23 respectively in the walls of the truncated cones 4 and 5, and are fixed in insulating terminal blocks 24 and 25 which in turn are fixed to the lower support plate 6. The elements 20 and 21 are electrically connected in series through a switch 26 to a current supply (the electrical circuit is not shown).

Arranged to fit in the cooking chambers 2 and 3 through the holes 13 and 14 are two similar egg holders 27 and 28. Now, as the egg holders 27 and 28 are similar, we will describe the holder 27 shown in FIG. 3 in detail, a nd the same reference numerals can be regarded as applying to the corresponding parts of the holder 28 but with the suffix a.

The egg holder 27 has a melamine handle comprising a circular base 29, a Tubular shank 30 extending coaxially from the top of the base 29, the bore 31 of the shank 30 also passing through the base 29, and two arms 32 and 33 which extend radially in diametrically opposite directions from the top of the shank 30. Depending from the under surface of the base 29 is an annular skirt 34 having four radially extending grooves 35 at 90° intervals in which four thin rigid steel fingers 36 are pivotally mounted. The pivot pin 37 of each finger 36 extends at right angles to the direction of its corresponding groove 35 and is mounted in the walls of the groove. Each finger 36 is therefore able to rock about its pivot 37 in the direction of the groove.

Surrounding the skirt 34 is a cup-shaped steel retainer plate 38, and this plate is fixed to the under surface of the base 29 so that the rim 39 of the plate fits in an annular groove 40 encircling the skirt 34. The plate 38 has four radially extending slots 41 through which the fingers 36 extend, and attached at a point on the periphery of the rim 39 of the plate 38 is a lug 42.

Figure 3:
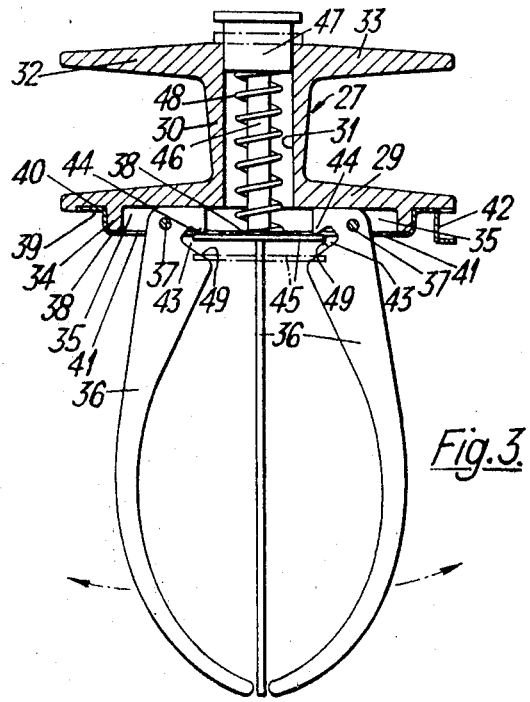
FIG. 3 is a more detailed view, partly in section, of one of the holders.

The fingers 36 are shaped so that, when in the closed position shown in FIG. 3, their inner edges define an egg shaped enclosure suitable for holding a hen's egg of the largest size practically encountered. Near the tops of the inner edges of the fingers 36 are similar slots 43, the top edges 44 of which just project downwards through the corresponding slots 41 in the retainer plate 38 when in the closed position. These edges 44 are engaged by a circular plate 45 fixed on the end of a shaft 46 which extends up through the bore 31 where it is fixed to the bottom of a button 47 which is a sliding fit in the top of the bore 31. Surrounding the shaft 46 and acting between the retainer plate 38 and the button 47 is a helical compression spring 48. This spring urges the button 47 away from the bore 31 and hence pulls the plate 45 against the edges 44 of the finger slots 43, thus pivoting the fingers 36 inwards to the closed position shown in FIG. 3 when the flat tops of the fingers 36 bear against the bottoms of the grooves 35 and the plate 45 bears against the underside of the retainer plate 38 to prevent further movement.

The fingers 36 are opened, either to allow an egg to be placed between them or to remove an egg, by gripping the handle of the holder and depressing the button 47. This may be done by placing two fingers of one hand under the arms 32 and 33 with the shank 30 between them, and depressing the button 47 with the thumb. On pressing the button 47 down, the plate 45 is moved downwards so that it engages the lower surfaces 49, which form cam surfaces, of the slots 43 and rides over these surfaces to force the fingers 36 to swing outwards about their pivots 37. The depressed position of the plate 45 is shown in chain dotted lines in FIG. 3. On releasing the button 47 the action of the spring 48 returns the fingers 36 to the closed position.

When a holder is inserted into the corresponding cooking chamber, for example, the holder 27 in the chamber 2 as shown in FIG. 1, the outer edge of the base 29 rests on the top of the casing 1 and the side of the cup-shaped retainer plate 38 fits snugly within the rim 18 of the opening to the chamber 2. The base 29 of the holder handle effectively forms a closure member for the top of the cooking chamber 2 and the lug 42 extends down outside the flange 16. The fingers 36 extend downwards to near the bottom of the chamber 2, and the lower ends of the fingers are surrounded by the heating element 20. The bottom of the cooking chamber 2, which is formed by the lower support plate 6, has a depressed portion 50 which opens through a central hole 51 into a removable tray 52 which is supported on the base plate 7 so that any debris from the cooking chamber 2 can be collected and removed. Similarly, the cooking chamber 3 has a depression 53 and hole 54 in its bottom and a removable tray 55 is supported on the base plate 7 beneath the hole 54.

The switch 26 which opens and closes the heating circuit for the ring elements 20 and 21 is mounted on the lower end of a rocker arm 56 which is pivoted about its center 57 on a plate 58 fixed to the central web 9 between the two truncated cones 4 and 5. The upper end of the plate 58 has three tongues 59, 60 and 61, each of which projects through a hole 62 in the upper support plate 12. Besides being fixed to the web 9, the plate 58 is held laterally and vertically steady by means of projections 63 and 64 from the edge of the hole 62 which engage in slots 65 and 66 in the outside tongues 59 and 61. The center tongue 60 is T-shaped and also projects through a hole 67 in a lock plate 68 lying on the plate 12, the crossbar of the tongue 60 serving to keep the plate 68 on the plate 12. The plate 68 has a hooked end 69 which projects down through the hole 62 and engages the upper end of the rocker arm 56.

The plate 68 extends in a direction perpendicular to the line of the web 9 and at its end remote from the hooked end 69, two arms 70 and 71 project one from each side to extend alongside the flanges 16 and 17 at the tops of the cooking chambers 2 and 3. The front edges of the arms 70 and 71 adjacent the flanges 16 and 17 are turned upwards to form abutments 72 and 73.

Insertion of either one of the egg holders 27, 28 into its cooking chamber 2, 3 and then turning it, brings the lug 42, 42 a into engagement with the corresponding abutment 72, 73. This forces the arm 70, 71 outwards and causes the plate 68 to pivot about the tongue 60. However, if both egg holders are inserted and turned so that each lug engages its abutment, both the arms 70 and 71 are moved outwards, thus causing the plate 68 to slide outwards with the tongue 60 riding along the hole 67. This movement causes the hooked end 69 to pull on the upper end of the rocker arm 56 so that this arm is rocked about the pivot 57, thus swinging the lower end of the arm 56, and hence the switch 26, in the opposite direction away from the web 9.

The switch 26 has two fixed common contacts 74 and 75 and suspended between them is a contact arm 76. This arm is pivotally connected at its upper end to the switch 26 and engages at its lower end a stop 77. Therefore, when the switch 26 is swung outwards on the rocker arm 56, the contact arm 76 is restrained from moving with it by the stop 77 and the fixed contact 75 thus swings towards the contact arm 76, although it does not reach the arm 76 and the switch remains open. The switch 26 is now cocked and can be closed by setting a timing mechanism 78 to determine how long the eggs are to be cooked.

The timing mechanism 78 comprises a knob 79 which is set in a recess 80 in the top of the casing 1 and which is mounted on a shaft 81 passing down through the casing 1, through a notch 82 in the lock plate 68 and through the upper support plate 12. The lower end of the shaft 81 is fixed in a cam carrier 83 which extends through an elliptical hole 84 in an arm 85 resting on the lower support plate 6. The cam carrier 83 also passes tightly through a circular hole 86 in the plate 6 and is attached to a timing device 87 which is carried by a mounting 88 fixed to the under side of the plate 6. On turning the knob 79, the timing device 87 is set going and slowly returns the knob 79, through the cam carrier 83 and the shaft 81 to its initial position, the time taken to do this being dependent on the angle through which the knob was turned initially.

Figure 2:
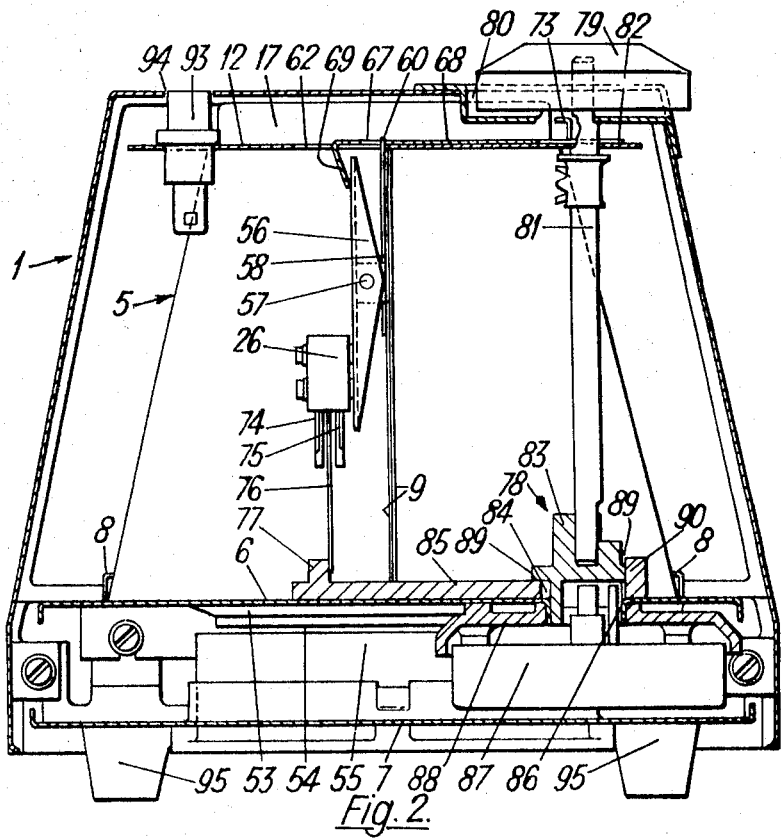
FIG. 2 is a vertical section on the line II—II in FIG. 1.
Figure 4:
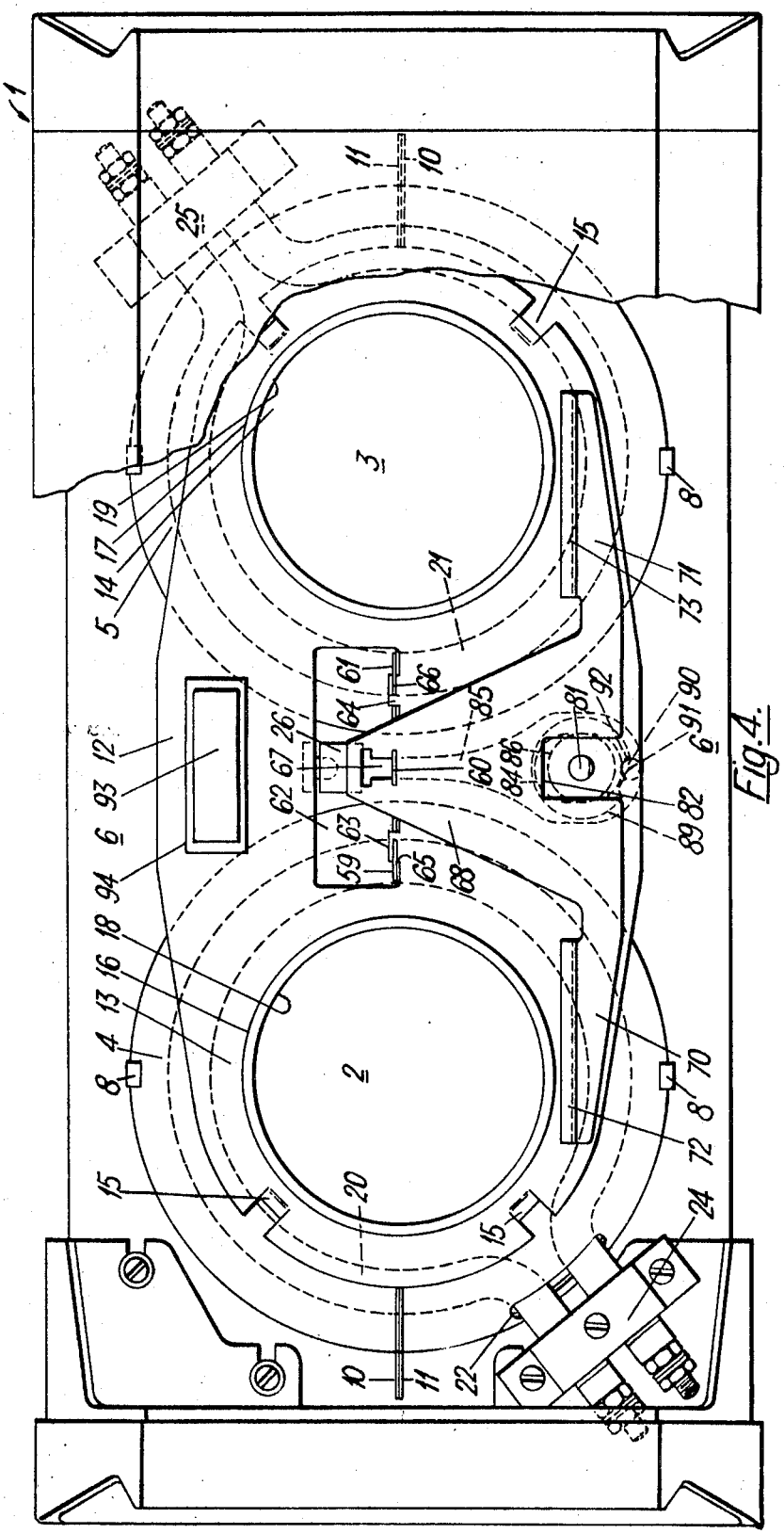
FIG. 4 is a top plan of the cooker with most of the top of its outer casing cut away to show more detail of the inside.

The cam carrier 83 has a cam surface 89 and this bears on a pin 90 at one end of the arm 85. The pin 90 is urged into engagement with the cam surface by a spring device which is not shown. The other end of the arm 85 projects through the web 9 and carries the stop 77 which engages the pivoted contact arm 76 of the switch 26. The cam surface 89 is shaped as shown by the phantom lines 89 in FIG. 4, and with the timing mechanism 78 in the off position shown in FIG. 2, the pin 90 is engaged by a dwell portion 91. However, on setting the timing device 87 going by turning the knob 79, the cam surface 89 is also turned so that the pin 90 is first engaged by a steep portion 92 which forces the arm 85 to move to the right (as seen in FIG. 2), and then by a remaining curved portion which keeps the arm 85 moved to the right. In moving to the right the arm 85 causes the stop 77 to pull the contact arm 76 towards the fixed contact 75 and, provided the switch 26 has been cocked, these two contacts engage each other and close the switch 26. This completes the heating circuit and the heating elements 20 and 21 are then heated to cook the eggs held in the chambers 2 and 3. When the switch 26 is on, a lamp 93 which is also connected in the circuit is lit up. The lamp 93 is mounted on the upper support plate 12 and is visible through a slot 94 in the top of the casing 1.

As the set cooking time elapses the cam 89 slowly unwinds and the pin 90 rides over the curved portion of the cam until, on expiry of the set time, the steep portion 92 is reached and the pin 90 is allowed to return to the dwell portion 91. This moves the contact arm 76 out of engagement with the contact 75 and the switch is opened. Removal of the egg holders 27 and 28 from the cooking chambers 2 and 3 disengages the lugs 42 and 42 a from the abutments 72 and 73, and the rocker arm 56 is then caused to return to its initial position, thus uncocking the switch 26, by means of a coiled torsion spring (not shown) around the pivot pin 57.

The cooker rests on four feet 95 fixed near the corners of the under side of the base plate 7.

We claim:

1. An electrical cooker for cooking poultry eggs in their shells without water, said cooker including a cooking chamber, means defining an opening at the top of said chamber, radiant electrical heating means within said chamber and a holder for an egg which is arranged to be inserted into said chamber through said opening, said holder comprising a closure for said chamber, at least three fingers depending from said closure, means spring loading said fingers towards each other to enable said fingers to hold an egg between them, and a mechanism including manual operating means movably mounted on top of said closure for moving said fingers apart from each other against said spring loading to enable an egg to be inserted between said fingers before cooking and to enable a cooked egg to deposited by said holder into an egg cup.

2. A cooker as claimed in claim 1, wherein said manual operating means is a button and further comprising means mounting said button for upward and downward movement through said closure.

3. A cooker as claimed in claim 2, further comprising a handle on the top of said closure, said handle being shaped to enable it to be held with the fingers of one hand while said button is pressed by the thumb of the same hand.

4. A cooker as claimed in claim 2, wherein said fingers are rigid and further comprising means pivotally attaching said fingers to said closure.

5. A cooker as claimed in claim 4, further comprising spring means urging said button upwards and providing said spring loading of said fingers, cam surfaces on said fingers, and a camming plate attached to said button, movement of said camming plate along said cam surfaces on depressing said button against the action of said spring causing said fingers to swing outwards and return movement of said button under the action of said spring causing said plate to set on said cam surfaces to swing said fingers inwards.

6. A cooker for cooking poultry eggs in their shells without water, said cooker comprising a cooking chamber, means defining an opening in the top of said chamber, a holder for holding an egg in said chamber and a radiant electrical heating element in said chamber, said chamber being of upwardly tapering truncated conical shape chamber, of a size to hold a single egg in an upright position and said heating element being ring-shaped and located in the lower part of said chamber where, in use, it surrounds the lower part of an egg in said chamber.

7. A cooker as claimed in claim 6, wherein said upwardly tapering truncated conical chamber is made of metal having a heat reflecting internal surface.

8. A cooker as claimed in claim 6, wherein said chamber includes a detachably mounted bottom, said bottom being withdrawable to clean from it any droppings consequent upon the cooking of eggs in said chamber.

9. A cooker as claimed in claim 1, further comprising an electrical switch connected to said heating means and an adjustable presettable timing device which opens said switch after an adjustable preset time interval.

10. A cooker as claimed in claim 9, further comprising switch control means engageable by said holder upon insertion thereof into said chamber into a position in which said closure closes said opening, whereby said switch cannot be closed except when said chamber is closed by said closure.

11. A cooker as claimed in claim 9, further comprising an electric lamp connected to said heating means and said switch, illumination of said lamp indicating that said switch is closed.

12. A cooker as claimed in claim 1, further comprising a casing containing at least two separate cooking chambers, each chamber including an egg holder and heating means.